Oct. 29, 1929.  M. L. MacRAE  1,733,812
WIRE FEEDING MECHANISM FOR ARC WELDING MACHINES
Filed Nov. 29, 1927   2 Sheets—Sheet 1
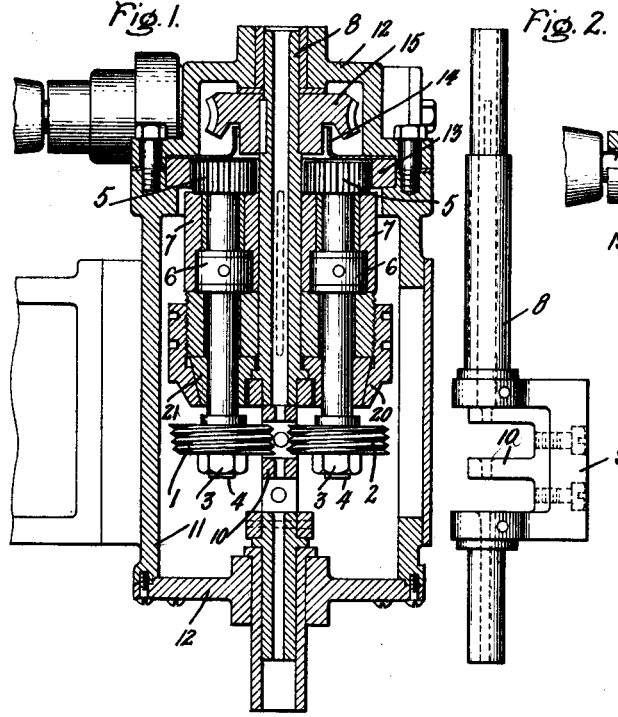
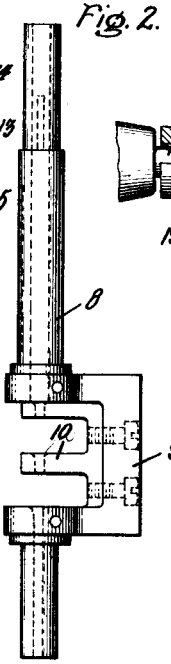
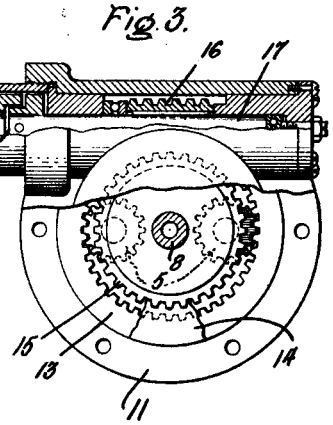
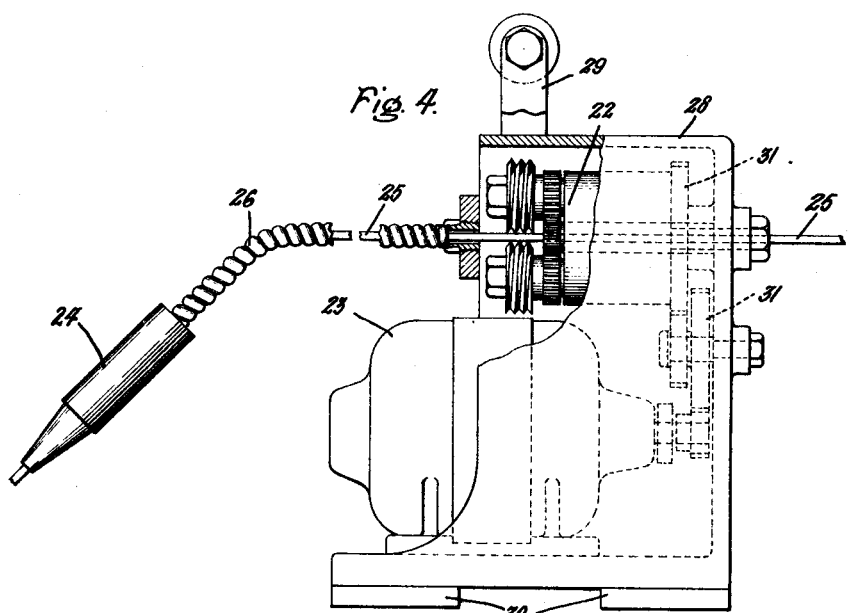
Inventor:
Mungo L. MacRae,
by *Alexander S. ...*
His Attorney.

Oct. 29, 1929.  M. L. MacRAE  1,733,812
WIRE FEEDING MECHANISM FOR ARC WELDING MACHINES
Filed Nov. 29, 1927  2 Sheets-Sheet 2
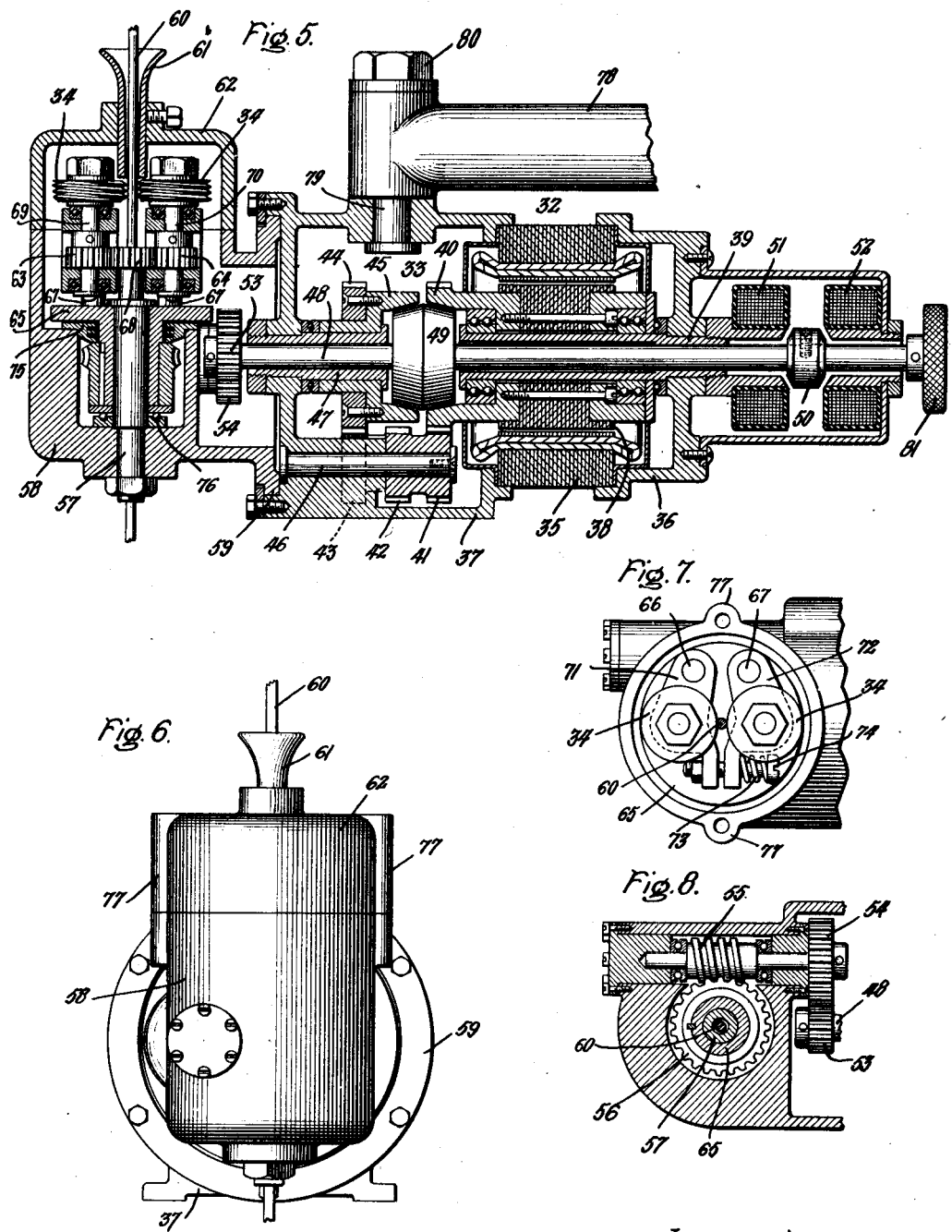
Inventor:
Mungo L. MacRae,
by His Attorney.

Patented Oct. 29, 1929

1,733,812

UNITED STATES PATENT OFFICE

MUNGO L. MacRAE, OF SCHENECTADY, NEW YORK, ASSIGNOR TO GENERAL ELECTRIC COMPANY, A CORPORATION OF NEW YORK

WIRE-FEEDING MECHANISM FOR ARC WELDING MACHINES

Application filed November 29, 1927. Serial No. 236,531.

My invention relates to a wire feeding mechanism which is of particular utility in automatic arc welding machines for feeding an electrode toward and away from the work to control the welding arc during the welding operation.

Automatic arc welding machines are now well known. In such machines the welding arc is ordinarily struck and maintained between the work to be welded and an electrode which as it is consumed is automatically fed toward the work so that the arc is maintained at a substantially constant length. In order to secure this operation it is customary to regulate the rate at which the electrode is fed in accordance with an electrical characteristic of the arc which varies with and is a measure of the arc length. Such a suitable characteristic is the voltage across the arc. Where the welding current varies substantially inversely with the voltage across the arc such variations in current may be used to govern the rate of feed. Other arrangements may be used such as combinations of voltage and current control.

In automatic machines for metallic arc welding where the electrode fuses rapidly and is incorporated in the weld it is desirable to provide the electrode in the form of a wire of indefinite length which may be drawn from a reel as it is used. The electrode may, however, be used in short lengths as is always the case where substantially non-consuming electrodes such as carbon are used.

It is customary to provide electrode feed rolls which grip the electrode and feed it forward as it is consumed. These feed rolls are usually driven through reduction and variable speed gearing by an appropriate feed motor. According to one arrangement a variable speed motor is used. In this arrangement the speed of the motor is automatically varied in accordance with an electrical characteristic of the arc that varies with the arc length and the arrangement is such that the feed motor by varying its speed operates in a manner to maintain the arc length substantially constant during the welding operation It is also old in the art to operate such electrode feeding mechanism from a constant speed driving means and regulate the rate of electrode feed by a speed regulating mechanism arranged between the constant speed driving means and the electrode feeding means.

In most of the machines of the prior art the motor is connected to the feed rolls through speed reducing gearing since it has been found desirable to operate the motor used to drive the feeding mechanism at a comparatively high rate of speed while the feed rolls of the feeding mechanism must of necessity turn at a lower rate of speed to feed the electrode toward the work as it is consumed in the arc. Changed speed gears are likewise used since the speed at which the electrode is fed must be greater for small electrodes than for larger electrodes and changes in speed are necessitated by the use of different current densities and correspondingly different rates of metal deposition.

An object of my invention is to provide an improved wire feeding mechanism which is of particular utility in welding machines because of its simiplicity and effectiveness and because it produces within itself an inherent speed reduction.

A further object of my invention is to provide a feeding device in which a threaded feed roll rotated about an axis substantially parallel to the line of wire feed is caused to engage the electrode wire and feed it by reason of a screwlike engagement therewith.

A further object is to provide means for rotating said feed roll about the wire being fed during the feeding operation at a rate of speed such that there is substantially no slipping action between the feed roll and the wire during the feeding of the electrode.

My invention will be better understood from the following description taken in connection with the accompanying drawing and its scope will be pointed out in the appended claims.

In the drawings Figs. 1, 2 and 3 show a section and two detail views, one of which is partly in section, of a feeding mechanism according to my invention. Fig. 4 shows a semi-automatic welding machine, partly in section, and Fig. 5 a section of a welding head which forms a part of an automatic arc welding machine a portion only of which is illustrated, in which my feeding mechanism is employed. Figs. 6, 7 and 8 are detail views of the head illustrated in Fig. 5.

Referring to Figs. 1, 2 and 3 of the drawings, feed rolls 1 carrying in their peripheries hardened helical V-shaped ribs or screw-threads 2 are secured by nuts 3 to the ends of spindles 4 and rotated about their axes by spur gears 5 attached to the other ends of the spindles. The spindles are formed of two shafts joined at 6 by universal joints which also serve to hold the spindles in place in the spindle casing 7. The spindle casing 7 is keyed to a hollow shaft 8 formed of two parts joined by a crank section 9 upon which is mounted an electrode guide member 10. This shaft is located within a casing 11 in bearings carried by end covers 12 for this casing. Casing 11 may form a part of the usual welding head of the automatic or semi-automatic machine or may be secured thereto in any convenient manner. The spur gears 5 mesh with a stationary circular rack 13 positively secured, together with an oil guard ring 14, between the top cover 12 and the casing 11. Shaft 8 is rotated by a worm wheel 15 keyed thereto and driven by worm 16 mounted on a shaft 17 positively connected to the feed motor shaft 18 by a coupling 19. The feed rolls 1 may be moved to and from each other an amount sufficient to accommodate various sizes of electrode wire by an adjusting nut 20 which has an inside conical surface at its lower edge in engagement with corresponding conical surfaces on bearings 21 which support the lower ends of the spindles 4 to which the feed rolls are attached. The universal joint in the spindles and the open construction of the lower part of the spindle casing readily permits this adjustment.

The operation is as follows: Electrode wire is fed through the upper end of the hollow shaft 8 to feed rolls 1 which are adjusted toward each other by adjusting nut 20 so as to firmly grip the wire between the screw threads 2. At this point the guide member 10 holds the wire in a central position with respect to the feed rolls. From the rolls the electrode is fed through the lower end of shaft 8 to a nozzle (not shown) which directs the electrode to the work. The welding current is conducted to the electrode in any convenient manner. The electrode feed motor (not shown) is connected in any known manner responsive to some electrical characteristic of the arc so that its speed is so regulated as to feed the electrode at a rate corresponding to its consumption in the arc. This motor rotates the worm 16 which revolves the spindle casing 7 through worm wheel 15. As the casing revolves gears 5 attached to the spindles 4 are rotated by their engagement with the stationary rack 13. Thus the electrode feed rolls 1 rotate about their own axes and also about the axis of shaft 8.

It is not necessary to my invention that the feed rolls be bodily rotated about the wire being fed but I prefer this arrangement since under certain conditions by rotating the feed rolls bodily about the wire at the proper rate of speed all slipping action between the feed rolls and the wire is elminiated and better results are secured. If the rolls are not rotated bodily about the wire and if the wire is not free to rotate as will be the case when withdrawn from a stationary reel the threads on the rolls will form notches in the wire spaced from one another the pitch of the screw threads which act through these notches to feed the wire relative to the feed rolls on which the threads are located. There is, however, under these conditions a wiping or slipping action between the wire and the rolls which tends to rotate the wire. The excessive friction losses resulting from this slipping action necessitate the use of more power than would be required if the feed rolls were bodily rotated about the wire and if the feed rolls are rotated bodily about the wire at the proper rate of speed this slipping action may be entirely eliminated. When the threaded rolls are rotated about the wire at the proper rate of speed spaced circular grooves are formed on the wire which are spaced from one another the pitch of the screw thread. The thread which forms these grooves likewise engages them and feeds the wire relative to the feed roll on which the thread is located to or from the work depending on the direction of rotation of the feed roll.

It is preferable to have several sets of feed rolls with threads of different pitches for any given machine which may be used as desired to secure various rates of electrode feed for any given speed of the feed motor. With any given set of rolls the speed of wire feed may be varied by varying the speed of the feed motor. By using several sets of feed rolls and by electrically adjusting the speed of the feed motor over a limited range with any given set of feed rolls it is possible to adapt one machine for a variety of speeds of wire feed without resorting to variable or change speed gearing. The adjustment of one feed roll relative to the other also enables the feeding mechanism to accommodate wires of various diameters.

In Fig. 4 I have illustrated my invention as applied to a portable semi-automatic arc welding machine such as described and claimed in Letters Patent of the United States No. 1,508,711 granted September 16, 1924 to Paul O. Noble and assigned to the same assignee as the present case. The apparatus illustrated comprises electrode feeding mechanism 22, according to my present invention, a motor 23 for operating the feeding mechanism, a welding tool 24 to which an electrode 25 is adapted to be fed and a flexible metallic tube 26 for guiding the electrode from said feeding mechanism to the welding tool. The motor and feeding mechanism are supported in a partially enclosing casing 28 provided with a handle 29 and a base 30 which may conveniently be an electromagnet which when excited will firmly attach the casing to a magnetic supporting surface. The motor 23 is shown as connected to the feeding device 22 through gears 31 although it will be understood that by aligning the feeding device with the feed motor and feeding the electrode through a hollow motor shaft these gears may be eliminated.

The motor 23 may be a variable speed motor connected so as to be responsive to a characteristic of the arc which varies with its length and thus vary its speed with changes in arc length in a manner to vary the rate of electrode feed to keep the arc length constant. For example, the motor may be electrically connected across the arc and be responsive to arc voltage. The voltage of an arc varies with its length and thus if the arc tends to lengthen then the voltage impressed on motor 23 will increase and consequently the speed will increase, thus feeding the electrode at a more rapid rate to re-establish the original arc length. As the arc length shortens the reverse operation will take place. When such an arrangement is used the operator is not required to be as skillful as where a constant speed motor is used to feed the electrode since when a constant speed motor is used dependence must be had on the skill of the operator for maintaining the arc length substantially constant.

The welding head shown in Fig. 5 is generally of the type shown in reissue Letters Patent of the United States to Frank L. Sessions, No. 14,927, granted July 27, 1920 where a constant speed motor is used as the driving means and the rate of electrode feed is regulated by a speed regulating means arranged between the constant speed driving means and the electrode feeding mechanism.

In Fig. 5 the constant speed feed motor 32 is built into the welding head and operates through means comprising a clutch 33 to drive electrode feeding rolls 34 forming part of my improved feeding mechanism, one embodiment of which has already been described.

The stator 35 of the feed motor 32 is clamped between parts 36 and 37 of the welding head casing and the rotor member 38 is supported on a hollow shaft 39 supported at its right by the part 36 of the welding head casing. The rotor member is provided with a combined gear and clutch element 40 at its left which through gears 41 and 42, a gear not shown located back of gear 42, gear 43 (shown partly in dotted lines) and gear 44 drives in a rotational direction opposite to itself a clutch element 45. Gears 41 and 42 are supported on a shaft 46 supported in casing 37. The gear not shown in the drawing and the gear 43 are supported on a shaft, not shown in the drawing, which is located back of the shaft 46. Gear 44 and clutch element 45 are supported on hollow shaft 47 supported as the other shafts already referred to in casing part 37. On a shaft 48 supported within the hollow shafts 39 and 47 is a clutch element 49 which may be moved into engagement with either clutch element 40 or 45 by a longitudinal movement of the shaft 48 produced by the movement of an arm 50 which is under the influence of two operating coils 51 and 52 forming part of the welding head.

Coils 51 and 52 may be energized by the operation of a contact making voltmeter responsive to the arc voltage as disclosed in Letters Patent of the United States to Wilbur L. Merrill, No. 1,541,582, granted June 9, 1925, and assigned to the same assignee as the present case. According to this arrangement one coil will be energized when the arc length is too great and the other coil energized when the arc length is too short, thus depending on arc conditions clutch element 49 will be brought into engagement with either clutch elements 40 or 45 and shaft 48 will be rotated in one direction or the other to control the electrode feed.

Connected to the left end of shaft 48 is a gear 53 meshing with a gear 54 mounted on the same shaft as worm 55 which engages worm wheel 56 of the feeding mechanism. The arrangement is best shown in the sectional view of Fig. 8. The feeding mechanism is thus rotated in one direction or the other depending on the rotational direction of shaft 48.

The feeding mechanism is supported on a hollow spindle 57 supported in casing part 58 attached to casing part 37 by means of a slip joint 59. The attachment is such that casing part 58 may be rotated relative to casing part 37 about the axis of shaft 48. The feeding mechanism is rotated about the hollow spindle 57 by worm wheel 56 and the electrode wire 60 is fed through a bellmouth guide member 61 inserted in casing part 62 and through the hollow spindle 57 by the feed rolls 34 which are rotated about their own axes by gears 63 and 64 and about the wire by a member 65 which is driven by wormwheel 56 and upon which they are pivotally supported at 66 and 67 (see Fig. 7). Gears 63 and 64 mesh with a gear 68 attached to or forming a part of hollow spindle 57 which is a stationary member and as the feed rolls 34 and gears 63 and 64, which are connected by shafts 69 and 70 with the feed rolls, are rotated about the electrode by member 65 to which they are pivoted at 66 and 67 through brackets 71 and 72 the feed rolls will be given a rotary motion about their own axes. The feed rolls are forced into engagement with the electrode by a spring 73 which acts through brackets 71 and 72. The tension of the spring may be regulated by a screw 74. Member 65 is steadied by a member 75 engaging casing part 58 and the weight of the feeding means is supported upon a thrust bearing 76. The casing part 62 forms a cover for part 58 which may be raised or removed when it is necessary to change the feed rolls 34. The cover is supported on pins extending through bosses 77 (best shown in Fig. 6).

The welding head may be secured in the welding machine in various manners. As illustrated, it is supported from a part 78 of the welding machine by a bolt 79 about which it may be swung and clamped in an adjusted position by bolt 80. A handwheel 81 is provided for rotating shaft 48 in order to thread the electrode 60 through the welding head when preparing it for operation or for controlling the electrode when the head is deenergized.

The operation of the welding head just described is as follows: The head is swung about bolt 79 and the feeding mechanism adjusted relative to the body part of the head at 59 so that the electrode is directed in the desired direction. Electrode 60 is threaded through the feed rolls 34 and through hollow spindle 57 by operating handwheel 81 which rotates shaft 48 which is gear connected to the feeding mechanism. The machine may then be put in operation. Depending upon the arc voltage, as has previously been explained, either coil 51 or 52 will be energized and cause clutch element 49 to engage either clutch element 40 or 45. These clutch elements, as has been explained, rotate in opposite directions and hence shaft 48 will be rotated in opposite directions to operate the feeding means to feed the electrode to or from the work. Thus while the feed motor 32 is operating at constant speed due to the speed regulating mechanism forming part of the head the electrode is fed to and from the work in a manner to strike and maintain the welding arc.

It is thus seen that I have provided an improved electrode feeding mechanism operable by a variable speed motor, the speed of which is automatically varied in accordance with an electrical characteristic of the arc or by a constant speed motor, the speed of the electrode feed being regulated by the transmission mechanism. It will also be apparent that the electrode feeding means is of general utility and may be applied to gas welding machines and that it may be used to feed wire in apparatus other than welding machines.

The embodiments of the invention illustrated herein have been selected for the purpose of clearly setting forth the principles involved. It will be apparent, however, that the invention is susceptible of being modified to meet the different conditions encountered in use without departing from my invention and I therefore aim to cover by the appended claims all modifications within the true spirit and scope of my invention.

What I claim as new and desire to secure by Letters Patent of the United States, is:

1. An electrode feeding mechanism for automatic arc welding machines comprising a threaded feed roll supported for rotation about an axis substantially parallel to the line of electrode feed, means for forcing said feed roll into engagement with the electrode and means for positively rotating said feed roll.

2. An electrode feeding mechanism for automatic arc welding machines comprising a threaded feed roll supported for rotation about an axis substantially parallel to the line of electrode feed, means for forcing said feed roll into engagement with the electrode, means for driving said feed roll to rotate it about its axis of rotation, and means responsive to a characteristic of the arc that varies with the arc length for controlling the operation of said feed roll to maintain the arc length substantially constant.

3. An electrode feeding mechanism for automatic arc welding machines comprising a plurality of similarly threaded feed rolls, means for forcing said feed rolls into engagement with the electrode, means for supporting said feed rolls for rotation about an axis substantially parallel to the axis of the electrode, and means for simultaneously rotating said feed rolls about their own axes and bodily about the electrode.

4. A wire feeding mechanism comprising a plurality of similarly threaded feed rolls, means for forcing said feed rolls into engagement with the wire to be fed, means for supporting said rolls for rotation about axes substantially parallel to the axis of the wire, means for rotating said supporting means about the wire, and means for simultaneously rotating said feed rolls.

5. A wire feeding mechanism comprising a threaded feed roll, means for forcing said feed roll into engagement with the surface of the wire to be fed, means for rotating said feed roll about its axis to feed the wire, and means for rotating said feed roll about the wire as an axis at such a rate of speed that there is substantially no slipping action between the feed roll and the wire.

6. An electrode feeding mechanism for automatic arc welding machines comprising a threaded feed roll, means for forcing said feed roll into engagement with the electrode, means responsive to a characteristic of the arc that varies with the arc length for positively rotating said feed roll at speeds such as will feed the electrode to maintain the arc length substantially constant, and means for simultaneously rotating said feed roll about the electrode as an axis at a rate of speed such that there is substantially no slipping action between the feed roll and the electrode during the feeding of the electrode.

7. An electrode feeding mechanism for arc welding machines comprising electrode engaging means, a driven shaft for operating said electrode engaging means to feed the electrode to or away from the work, a substantially constant speed feed motor, a hollow shaft for supporting the rotor of said feed motor as well as said driven shaft, a clutch element mounted on said rotor, a second clutch element mounted on a second hollow shaft through which said driven shaft extends, means for driving said clutch element from said rotor in a direction opposite to that of said first-mentioned clutch element, a third clutch element secured to said driven shaft and located between said first-mentioned clutch elements and means for shifting this clutch element into and out of angagement with the other clutch elements in response to a characteristic of the arc that varies with the arc length whereby the rate of electrode feed is controlled in a manner to maintain the arc length substantially constant.

8. A machine comprising a power shaft, wire feeding mechanism driven by said power shaft, means for rotating said wire feeding mechanism about the wire to be fed, means for supporting said feeding mechanism, and means for adjutably attaching said supporting means and said rotating means in the machine for rotation about the power shaft as an axis.

9. A machine comprising a power shaft, wire feeding mechanism driven by said shaft, a spindle whose axis is substantially parallel to the line of wire feed, means for supporting said feeding mechanism for rotation about said spindle, a support for said spindle and means for attaching said support in said machine so that it may be adjusted relative thereto about an axis coincident with the axis of the power shaft.

In witness whereof, I have hereunto set my hand this 28th day of November, 1927.

MUNGO L. MacRAE.